United States Patent
Iko

(10) Patent No.: US 11,076,110 B2
(45) Date of Patent: Jul. 27, 2021

(54) COMMUNICATION APPARATUS AND CONTROL METHOD THEREOF

(71) Applicant: CANON KABUSHIKI KAISHA, Tokyo (JP)

(72) Inventor: Takumi Iko, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 8 days.

(21) Appl. No.: 16/371,320

(22) Filed: Apr. 1, 2019

(65) Prior Publication Data

US 2019/0335112 A1    Oct. 31, 2019

(30) Foreign Application Priority Data

Apr. 26, 2018 (JP) .............................. JP2018-085719

(51) Int. Cl.
| | |
|---|---|
| *H04N 5/265* | (2006.01) |
| *H04N 7/08* | (2006.01) |
| *H04N 5/232* | (2006.01) |
| *H04N 5/247* | (2006.01) |

(52) U.S. Cl.
CPC ......... *H04N 5/265* (2013.01); *H04N 5/23216* (2013.01); *H04N 5/23245* (2013.01); *H04N 5/247* (2013.01); *H04N 7/08* (2013.01)

(58) Field of Classification Search
CPC .......... H04N 5/265; H04N 7/08; H04N 5/247; H04N 5/23245; H04N 5/23216; H04N 1/00307; H04N 1/2112; H04N 1/00106; H04N 1/00127; H04N 1/00167; H04N 1/21; H04N 5/232939; H04N 5/2621
See application file for complete search history.

(56) References Cited

U.S. PATENT DOCUMENTS

| | | | | |
|---|---|---|---|---|
| 7,543,327 | B1* | 6/2009 | Kaplinsky | ........ G08B 13/19656 348/143 |
| 2011/0115917 | A1* | 5/2011 | Lee | .......................... G06K 9/32 348/159 |
| 2014/0022398 | A1* | 1/2014 | Kimura | .............. H04N 1/00127 348/207.1 |

(Continued)

FOREIGN PATENT DOCUMENTS

| | | | |
|---|---|---|---|
| JP | 2014082741 A | * | 5/2014 |
| JP | 2014-107775 A | | 6/2014 |

*Primary Examiner* — Abdelaaziz Tissire
(74) *Attorney, Agent, or Firm* — Venable LLP

(57) ABSTRACT

An apparatus, when it is determined that a resolution of a captured image is higher than or equal to a predetermined resolution, transmits, to an external apparatus, a first request for an image of a resolution corresponding to a resolution higher than or equal to the predetermined resolution, and when it is determined that the resolution of the captured image is not higher than or equal to the predetermined resolution, transmits, to the external apparatus, a second request for an image of a resolution corresponding to a resolution lower than the predetermined resolution, performs control to sequentially receive images that are sequentially captured by the external apparatus, and performs control to combine the images that are captured by the external apparatus with the images that are sequentially generated by the image capturing, and sequentially display the combined images.

10 Claims, 10 Drawing Sheets

(56) References Cited

U.S. PATENT DOCUMENTS

| | | | |
|---|---|---|---|
| 2014/0085360 A1* | 3/2014 | Ohno | G09G 3/36 |
| | | | 345/694 |
| 2014/0118478 A1* | 5/2014 | Nakazawa | H04N 7/12 |
| | | | 348/14.13 |
| 2015/0271401 A1* | 9/2015 | Khoury | H04N 21/23439 |
| | | | 348/36 |
| 2015/0319360 A1* | 11/2015 | Sato | H04N 5/23206 |
| | | | 348/207.11 |
| 2016/0065849 A1* | 3/2016 | Homma | H04N 5/23293 |
| | | | 348/36 |
| 2016/0105796 A1* | 4/2016 | Iko | H04W 76/11 |
| | | | 370/338 |
| 2016/0173705 A1* | 6/2016 | Nordstrom | H04N 1/00204 |
| | | | 348/207.1 |
| 2016/0381276 A1* | 12/2016 | Li | G06F 3/04842 |
| | | | 348/211.3 |
| 2017/0289427 A1* | 10/2017 | Eum | H04N 5/23206 |
| 2017/0332009 A1* | 11/2017 | Zhang | G06F 3/0482 |
| 2017/0347039 A1* | 11/2017 | Baumert | H04N 21/6587 |
| 2018/0025518 A1* | 1/2018 | Horie | H04N 7/181 |
| | | | 348/144 |
| 2018/0084397 A1* | 3/2018 | Sato | H04N 5/2251 |
| 2019/0166262 A1* | 5/2019 | Oh | G06F 16/583 |

* cited by examiner

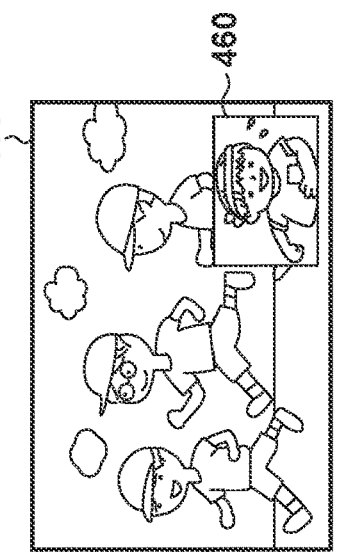

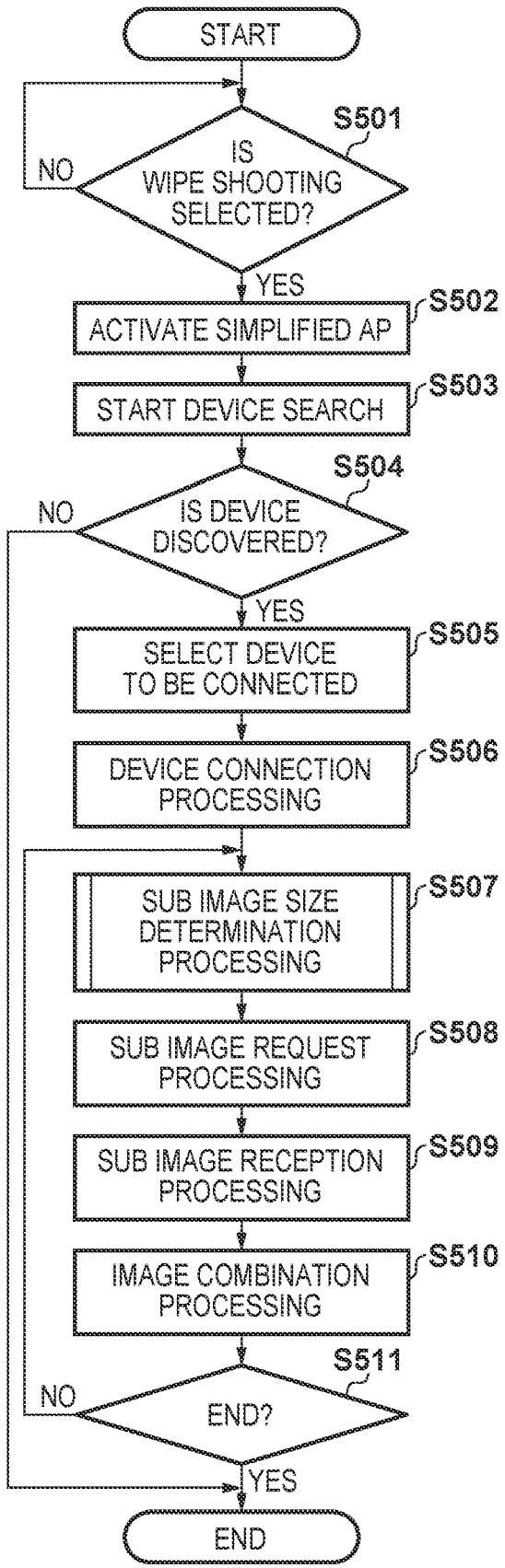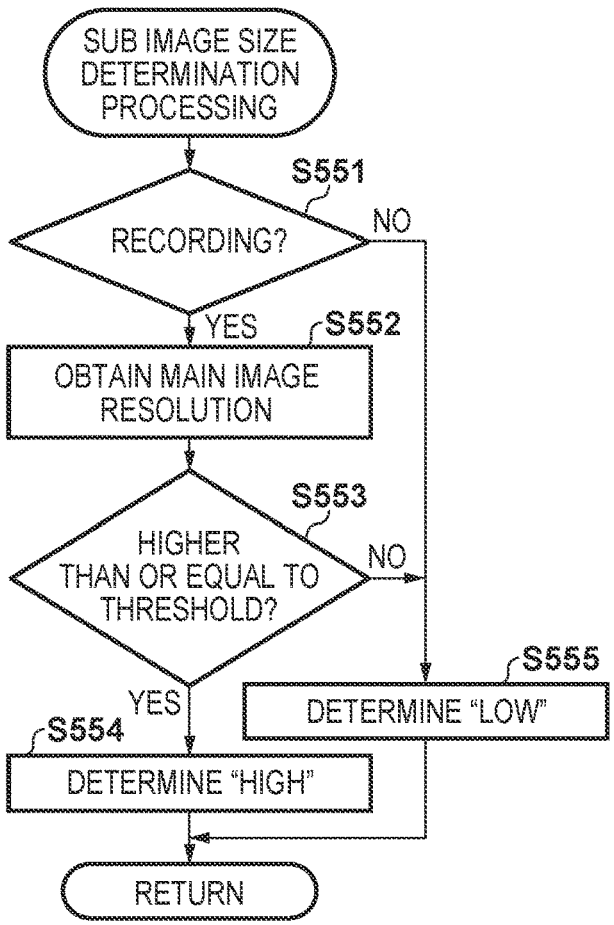
FIG. 5A
FIG. 5B

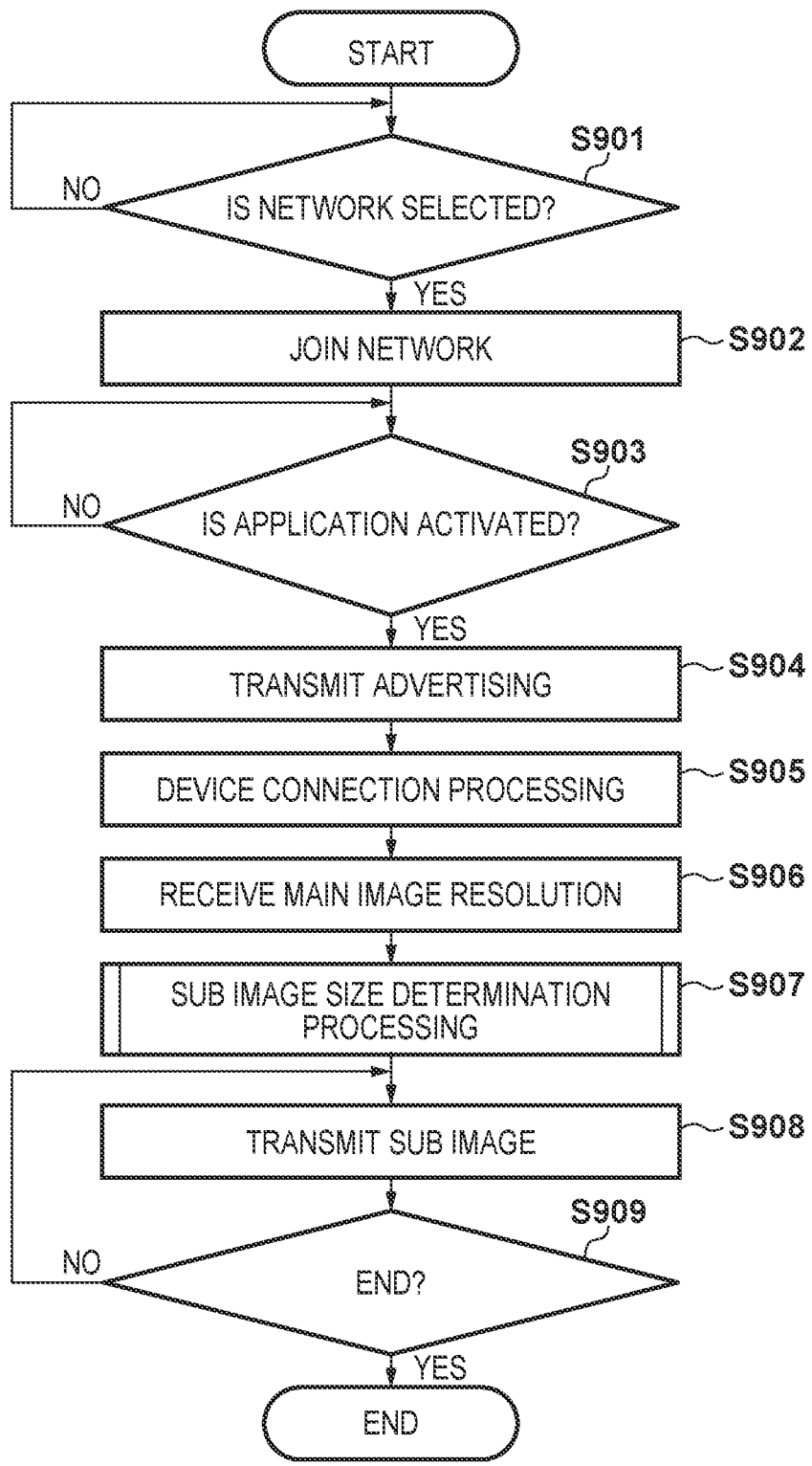

COMMUNICATION APPARATUS AND CONTROL METHOD THEREOF

BACKGROUND OF THE INVENTION

Field of the Invention

The present invention relates to a technique to combine images obtained from an external apparatus.

Description of the Related Art

Some image capture apparatuses equipped with a wireless communication apparatus, such as digital cameras, have the function of receiving image data from another device via wireless communication, and combining an image shot by the image capture apparatuses and an image obtained from the other device. Japanese Patent Laid-Open No. 2014-107775 discloses a technique in which an image capture apparatus obtains a main image showing a main scene and a sub image showing a sub scene, adjusts the sub image to a size smaller than the main image, and combines the images.

In Japanese Patent Laid-Open No. 2014-107775, as the size adjustment is made after the sub image is received, the data size of the sub image associated with the communication is not mentioned. However, when the data size of the sub image to be received is large, the amount of data associated with the communication becomes large, which gives rise to the possibility that the image quality of a combined image is affected by, for example, a delay or failure in the image reception. On the other hand, when the data size of the sub image to be received is small, if there is a need to enlarge the sub image at the time of image combining, there is a possibility that the image quality of a combined image is affected by the lowered image quality of the sub image.

SUMMARY OF THE INVENTION

The present invention has been made in consideration of the aforementioned problems, and realizes a technique to enable obtainment of an image that is appropriate to be combined from an external apparatus.

In order to solve the aforementioned problems, the present invention provides a communication apparatus, comprising: a wireless communication unit; an image capturing unit; and a control unit, wherein the control unit controls the image capturing unit to sequentially generate images by capturing images of an object, wherein the control unit determines whether a resolution of an image generated by the image capturing unit is equal to or higher than a predetermined resolution, wherein when the control unit determines that the resolution of the image generated by the image capturing unit is higher than or equal to the predetermined resolution, the control unit transmits, to an external apparatus via the wireless communication unit, a first request that requests the external apparatus for an image of a resolution corresponding to a resolution higher than or equal to the predetermined resolution, and when the control unit determines that the resolution of the image generated by the image capturing unit is not higher than or equal to the predetermined resolution, the control unit transmits, to the external apparatus via the wireless communication unit, a second request that requests the external apparatus for an image of a resolution corresponding to a resolution lower than the predetermined resolution, wherein the control unit performs control to sequentially receive, from the external apparatus via the wireless communication unit, images that are sequentially captured by the external apparatus that has received the first request or the second request, and wherein the control unit performs control to combine the images that are captured by the external apparatus and sequentially received from the external apparatus with the images that are sequentially generated by the image capturing unit, and sequentially display the combined images.

In order to solve the aforementioned problems, the present invention provides a method of controlling a communication apparatus having a wireless communication unit, an image capturing unit, and a control unit, wherein the control unit controls the image capturing unit to sequentially generate images by capturing images of an object, the method comprising: determining whether a resolution of an image generated by the image capturing unit is equal to or higher than a predetermined resolution, when it is determined that the resolution of the image generated by the image capturing unit is higher than or equal to the predetermined resolution, transmitting, to an external apparatus via the wireless communication unit, a first request that requests the external apparatus for an image of a resolution corresponding to a resolution higher than or equal to the predetermined resolution, and when it is determined that the resolution of the image generated by the image capturing unit is not higher than or equal to the predetermined resolution, transmitting, to the external apparatus via the wireless communication unit, a second request that requests the external apparatus for an image of a resolution corresponding to a resolution lower than the predetermined resolution, performing control to sequentially receive, from the external apparatus via the wireless communication unit, images that are sequentially captured by the external apparatus that has received the first request or the second request, and performing control to combine the images that are captured by the external apparatus and sequentially received from the external apparatus with the images that are sequentially generated by the image capturing unit, and sequentially display the combined images.

In order to solve the aforementioned problems, the present invention provides a non-transitory computer-readable storage medium storing a program for causing a computer to function as a communication apparatus, comprising: a wireless communication unit; an image capturing unit; and a control unit, wherein the control unit controls the image capturing unit to sequentially generate images by capturing images of an object, wherein the control unit determines whether a resolution of an image generated by the image capturing unit is equal to or higher than a predetermined resolution, wherein when the control unit determines that the resolution of the image generated by the image capturing unit is higher than or equal to the predetermined resolution, the control unit transmits, to an external apparatus via the wireless communication unit, a first request that requests the external apparatus for an image of a resolution corresponding to a resolution higher than or equal to the predetermined resolution, and when the control unit determines that the resolution of the image generated by the image capturing unit is not higher than or equal to the predetermined resolution, the control unit transmits, to the external apparatus via the wireless communication unit, a second request that requests the external apparatus for an image of a resolution corresponding to a resolution lower than the predetermined resolution, wherein the control unit performs control to sequentially receive, from the external apparatus via the wireless communication unit, images that are sequentially captured by the external apparatus that has received the first request or the second request, and wherein the control unit performs control to combine the images that are captured by the external apparatus and sequentially received from the external apparatus with the images that are sequentially generated by the image capturing unit, and sequentially display the combined images.

In order to solve the aforementioned problems, the present invention provides a mobile apparatus, comprising: a wireless communication unit; an image capturing unit; and a control unit, wherein the control unit receives a resolution of an image generated by an image capture apparatus that is different from the mobile apparatus from the image capture apparatus via the wireless communication unit, wherein the control unit controls the image capturing unit to sequentially generate images by capturing images of an object with a resolution based on the received resolution, and wherein the control unit sequentially transmits the images generated by the image capturing unit to the image capture apparatus.

In order to solve the aforementioned problems, the present invention provides a method of controlling a mobile apparatus having a wireless communication unit, an image capturing unit, and a control unit, the method comprising: receiving a resolution of an image generated by an image capture apparatus that is different from the mobile apparatus from the image capture apparatus via the wireless communication unit; controlling the image capturing unit to sequentially generate images by capturing images of an object with a resolution based on the received resolution, and sequentially transmitting the images generated by the image capturing unit to the image capture apparatus.

In order to solve the aforementioned problems, the present invention provides a non-transitory computer-readable storage medium storing a program for causing a computer to function as a mobile apparatus, comprising: a wireless communication unit; an image capturing unit; and a control unit, wherein the control unit receives a resolution of an image generated by an image capture apparatus that is different from the mobile apparatus from the image capture apparatus via the wireless communication unit, wherein the control unit controls the image capturing unit to sequentially generate images by capturing images of an object with a resolution based on the received resolution, and wherein the control unit sequentially transmits the images generated by the image capturing unit to the image capture apparatus.

According to the present invention, it is possible to obtain an image that is appropriate to be combined from an external apparatus.

Further features of the present invention will become apparent from the following description of exemplary embodiments with reference to the attached drawings.

BRIEF DESCRIPTION OF THE DRAWINGS

FIGS. 4A to 4E are diagrams exemplarily showing the screens that are displayed on the digital camera at the time of wipe shooting according to the first embodiment.

FIGS. 5A and 5B are flowcharts showing processing of the digital camera at the time of wipe shooting according to the first embodiment.

FIGS. 9A and 9B are flowcharts showing processing of the smart devices at the time of wipe shooting according to the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

The following describes a system that performs wipe shooting (picture-in-picture) processing in which a digital video camera (hereinafter referred to as a "digital camera") 100 and a smart device 200 perform wireless communication, image data received from the smart device 200 is combined with image data captured by the digital camera 100, and combined image data is displayed and recorded.

<Configuration of Digital Camera 100>

Figure 1A:
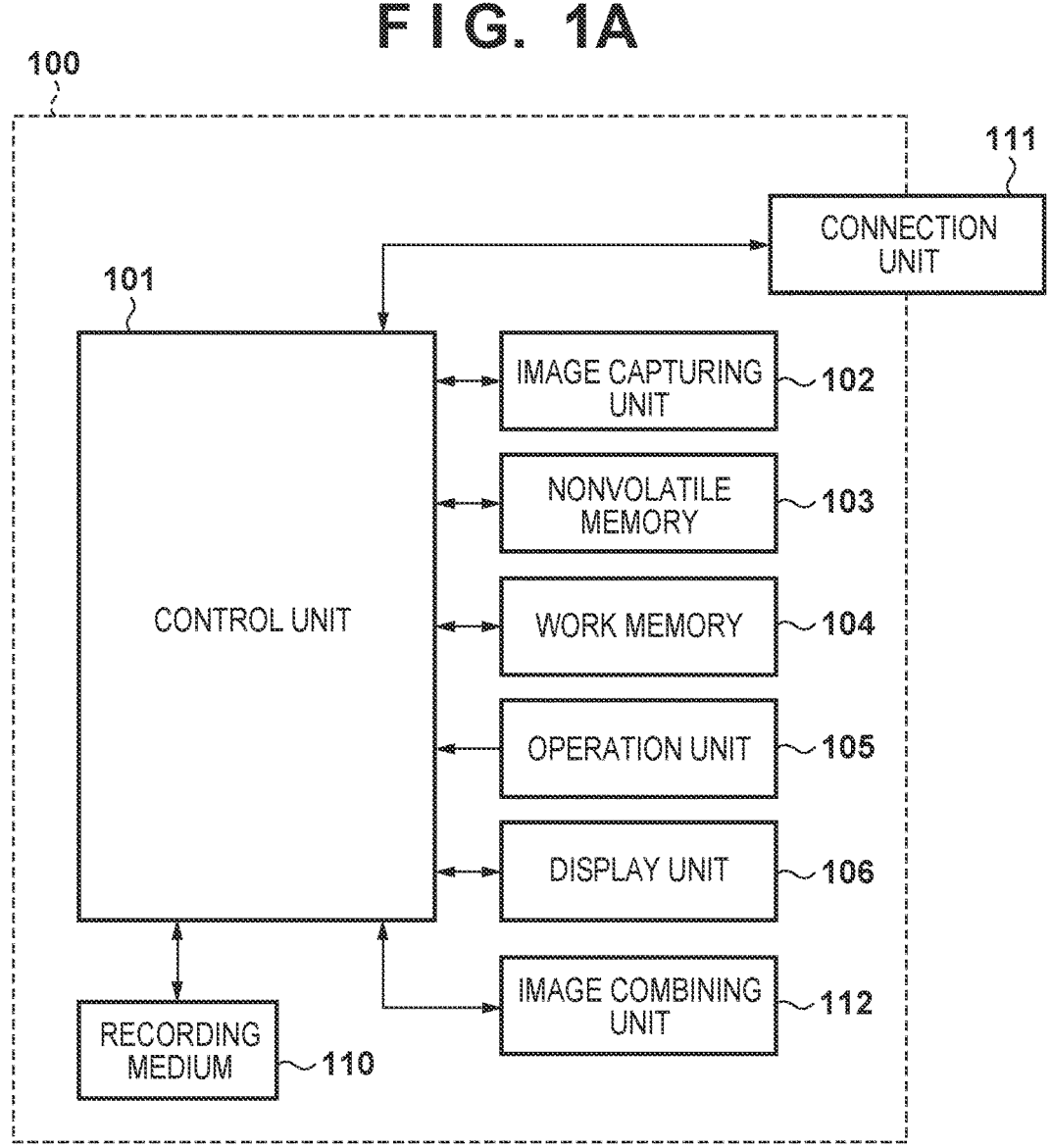
FIG. 1A is a block diagram showing a configuration of a digital camera according to a present embodiment.
Figure 1B:
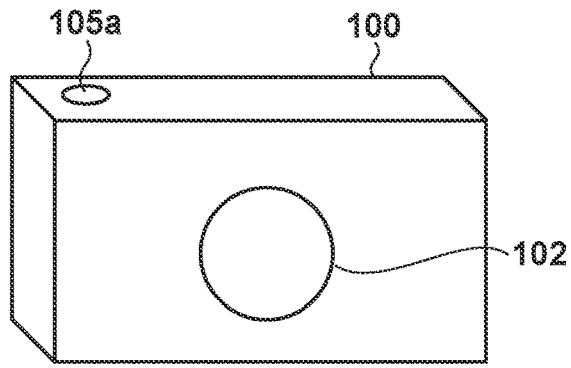
FIGS. 1B and 1C are front view and back view showing the configuration of the digital camera according to the present embodiment.
Figure 1C:
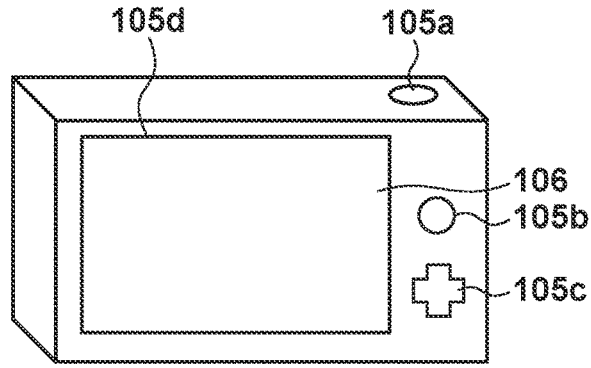

First, the configuration and functions of the digital camera 100 of the present embodiment will be described with reference to FIGS. 1A to 1C.

Note that, in the present embodiment, a digital camera that can capture a video image (hereinafter referred to as an "image") such as a still image or a moving image is described as an example of the communication apparatus. However, the data transfer apparatus is not limited to a digital camera, and may be a tablet device equipped with a camera function, an information processing apparatus such as a personal computer, a surveillance camera, a medical camera, or the like.

A control unit 101 is an arithmetic processing unit (CPU) which comprehensively controls the overall digital camera 100, and implements communication processing and control processing (to be described later) by executing programs stored in a nonvolatile memory 103 (to be described later). Note that a plurality of pieces of hardware may control the overall apparatus by sharing processes instead of the control unit 101 controlling the overall apparatus.

An image capturing unit 102 includes a lens group including a zoom lens and a focus lens and a shutter having a stop function. The image capturing unit 102 also includes an image sensor formed from a CCD, CMOS device, or the like which converts an object image into electrical signals, and an A/D converter which converts the analog image signal output from the image sensor into digital signals. Under the control of the control unit 101, the image capturing unit 102 converts object image light formed by a lens included in the image capturing unit 102 into electrical signals, using imaging elements, performs noise reduction processing or the like, and outputs image data consisting of digital signals. The image data output from the image capturing unit 102 is recorded on the recording medium 110 according to the DCF (Design rule for Camera File system) standards. Also, in wipe shooting processing according to the present embodiment, an image combining unit 112 (to be described later) combines the image data output from the image capturing unit 102 with image data received from a smart device 200, and the combined image data is displayed and recorded.

The nonvolatile memory 103 is an electrically erasable/recordable memory, and, for example, an EEPROM is used. Constants, programs, and the like for the operation of the control unit 101 are recorded in the nonvolatile memory 103. In this case, the programs are those for executing processing at the time of communication processing and control processing, which will be described later in the present embodiment.

A work memory 104 is used as a work area where constants and variables for the operation of the control unit 101, programs read out from the nonvolatile memory 103, and the like are to be loaded. The work memory 104 is also used as a buffer memory for temporarily holding the image data captured by the image capturing unit 102 or an image display memory for a display unit 106.

An operation unit 105 is constituted by operation members such as various types of switches and buttons, and a touch panel, which accept various types of operations from the user. The operation unit 105 includes, for example, a shutter button 105a for performing image shooting, a reproduction button 105b for performing a reproduction of shot images, and four-directional keys 105c constituted by up, down, left and right buttons for performing various settings of the camera, as shown in FIGS. 1B and 1C. The operation unit 105 also includes a touch panel 105d that is formed integrally with the display unit 106 that will be described later. The operation unit 105 also includes, for example, a connection button that is dedicated to the task of starting communication with a smart device 200, which is an external apparatus and will be described later.

The shutter button 105a is turned on to generate a first shutter switch signal SW1 when the shutter button 105a is operated halfway, that is, half-pressed (a shooting preparation instruction). Upon receiving the first shutter switch signal SW1, the control unit 101 controls the image capturing unit 102 to start an operation such as AF (Automatic Focus) processing, AE (Automatic Exposure) processing, AWB (Automatic White Balance) processing, or EF (Electronic Flash) processing. Also, the shutter button 105a is turned on to generate a second shutter switch signal SW2 when the shutter button 105a is operated completely, that is, full-pressed (a shooting instruction). Upon receiving the second shutter switch signal SW2, the control unit 101 starts a series of shooting operations from reading out a signal from the image capturing unit 102 to writing image data in the recording medium 110.

The display unit 106 displays, for example, a viewfinder image at the time of shooting, a shot image, and characters for a dialogical operation. The display unit 106 is, for example, a display device such as a liquid crystal display or an organic EL display. The display unit 106 may be formed integrally with the digital camera 100, or an external apparatus connected to the digital camera 100. The digital camera 100 need only be connectable to the display unit 106 and have the function of controlling display performed by the display unit 106.

Image data output from the image capturing unit 102 or combined image data generated by the image combining unit 112 is recorded on the recording medium 110, and an image file that has been recorded thereon by the control unit 101 is read out from the recording medium 110. The recording medium 110 may be a memory card or a hard disk drive that is to be coupled to the digital camera 100, or a flash memory or a hard disk drive that is built into the digital camera 100. The digital camera 100 has at least a method for accessing the recording medium 110.

A connection unit 111 is an interface for communicably connecting to an external apparatus such as the smart device 200 (described later). The digital camera 100 according to the present embodiment can exchange data with an external apparatus via the connection unit 111. For example, the digital camera 100 can transmit image data output from the image capturing unit 102 to an external apparatus via the connection unit 111, or can receive image data from an external apparatus via the connection unit 111. Note that, in the present embodiment, the connection unit 111 includes an interface for communication with an external apparatus via a wireless LAN complying with the IEEE 802.11 standards. The control unit 101 implements wireless communication with an external apparatus by controlling the connection unit 111. Note that the communication method is not limited to a wireless LAN and may include a wireless communication interface such as an infrared communication interface, Bluetooth® or a wireless USB. Also, the communication method may include a wired communication method such as USB cable, HDMI® or IEEE1394, etc.

The image combining unit 112 is a hardware processor such as a GPU (Graphics Processing Unit), and performs processing for combining two or more pieces of image data. At the time of wipe shooting, the image combining unit 112, for example, combines image data output from the image capturing unit 102 and one or more pieces of image data received from an external apparatus via the connection unit 111, and outputs them as one piece of combined image data. The combined image data is output to the display unit 106, or recorded on the recording medium 110 according to the DCF standards.

Note that the connection unit 111 of the digital camera 100 according to the present embodiment has an AP mode, in which the connection unit 111 operates as an access point for the infrastructure mode, and a CL mode in which the connection unit 111 operates as a client for the infrastructure mode. As a result of the connection unit 111 operating in the CL mode, the digital camera 100 according to the present embodiment can operate as a CL device for the infrastructure mode. When operating as a CL device, the digital camera 100 can join a network formed by AP devices, by connecting to an AP device in the vicinity of the digital camera 100. As a result of the connection unit 111 operating in the AP mode, the digital camera 100 according to the present embodiment can also operate as an AP, which is a simplified type of AP with limited functions (hereinafter referred to as a "simplified AP"). If the digital camera 100 operates as a simplified AP, the digital camera 100 forms a network by itself. Apparatuses in the vicinity of the digital camera 100 can recognize the digital camera 100 as an AP device, and join the network formed by the digital camera 100. It is assumed that programs that enable the digital camera 100 to operate as described above are held in the nonvolatile memory 103.

Although the digital camera 100 according to the present embodiment is a type of AP, the digital camera 100 is a simplified AP (employing a first communication method) that does not have a gateway function, which is the function of transferring data received from a CL device to an internet provider or the like. Therefore, even if the digital camera 100 receives data from another device that has joined the network formed by the digital camera 100, the digital camera 100 cannot transfer the data to a network such as the Internet.

<Configuration of Smart Device 200>

Figure 2:
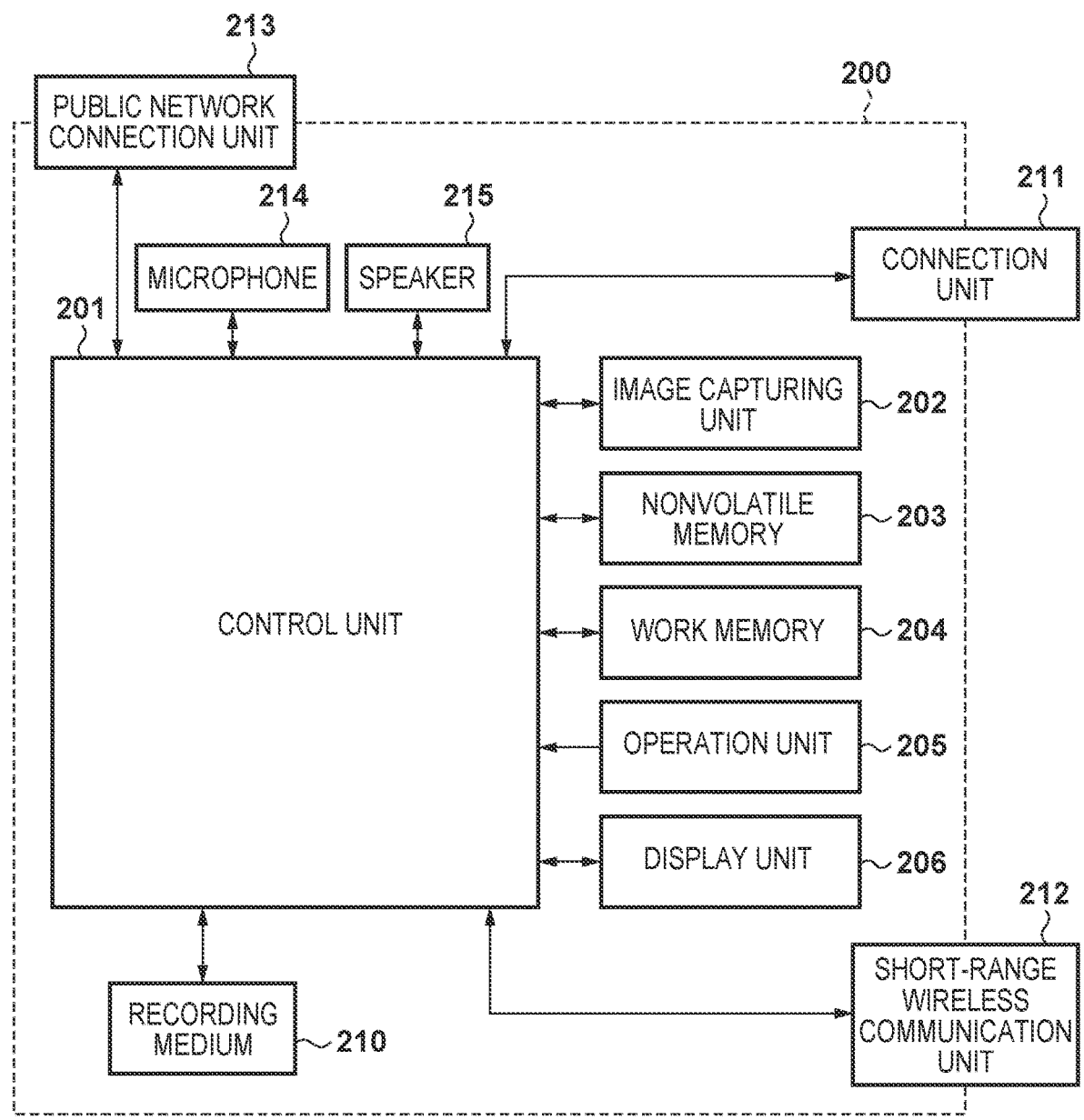
FIG. 2 is a block diagram and external view showing the configuration of a smart device according to the present embodiment.

Next, the configuration and functions of the smart device 200 of the present embodiment will be described with reference to FIG. 2.

Although the present embodiment describes a smart device as an example of a communication apparatus, the communication apparatus is not limited to a smart device, and may be a digital camera equipped with a wireless function, a smartphone, which is a type of cellular phone, a tablet device, a printer, a television, a personal computer, or a wearable computer such as a smart watch that has the shape of a wristwatch or smart glasses that have the shape of a pair of glasses.

The smart device 200 according to the present embodiment includes a control unit 201, an image capturing unit 202, a nonvolatile memory 203, a work memory 204, an operation unit 205, a display unit 206, a recording medium 210, and a connection unit 211. The basic functions of these elements are similar to those of the digital camera 100, and hence a detailed description of them will be omitted.

The nonvolatile memory 203 stores an OS (operating system), which is the basic software that is to be executed by the control unit 201, and applications which implement extended functions in cooperation with this OS. Also, in the present embodiment, the nonvolatile memory 203 stores a camera application for implementing communication processing and control processing with the digital camera 100.

The processing of the smart device 200 at the time of communication and control with the digital camera 100 according to the present embodiment may be implemented by loading software that is provided by the application. Note that the application includes software that is executed when basic functions of the OS installed in the smart device 200 are to be used. Alternatively, the OS in the smart device 200 may include software that is executed to implement processing according to the present embodiment.

The connection unit 211 includes a wireless LAN communication interface for wireless communication with an external apparatus such as the digital camera 100. The control unit 201 implements wireless communication with an external apparatus by controlling the connection unit 211. The connection unit 211 may be configured to be connected directly to the digital camera 100, or connected via an access point. PTP/IP (Picture Transfer Protocol over Internet Protocol) for communication via a wireless LAN may be used as a protocol for data communication, for example. Note that the communication with the digital camera 100 is not limited in them and may include a wireless communication interface, for example, an infrared communication interface, Bluetooth® or a wireless USB. Also, the communication method may include a wired communication method such as USB cable, HDMI® or IEEE1394, etc.

The short-range wireless communication unit 212 includes, for example, an antenna for wireless communication, a modulation/demodulation circuit for wireless signal processing, and a communication controller. The short-range wireless communication unit 212 outputs modulated wireless signals from the antenna, or demodulates wireless signals received by the antenna, to implement short-range wireless communication complying with the IEEE 802.15 standards (Bluetooth®). Note that the short-range wireless communication with the digital camera 100 is not limited in this.

A public network connection unit 213 is an interface used for wireless communication via a Wide Area Network (WAN), such as 3G or LTE. The smart device 200 can make a telephone call and perform data communication with another device via the public network connection unit 213. When making a telephone call, the control unit 201 inputs and outputs voice signals via a microphone 214 and a loudspeaker 215. In this embodiment, the public network connection unit 213 is not limited to 3G or LTE, and may use another communication method such as WiMAX, ADSL or FTTH. In the present embodiment, the public network connection unit 213 is an antenna, and the control unit 201 can connect to a public network via the antenna. Note that the connection unit 211 and the public network connection unit 213 are not necessarily formed using independent pieces of hardware. For example, both the connection unit 211 and the public network connection unit 213 may be formed using a single antenna.

<Wipe Shooting Processing>

Next, wipe shooting processing by the digital camera 100 and the smart device 200 according to the present embodiment will be described with reference to FIGS. 3 and 4A to 4E.

Figure 3:
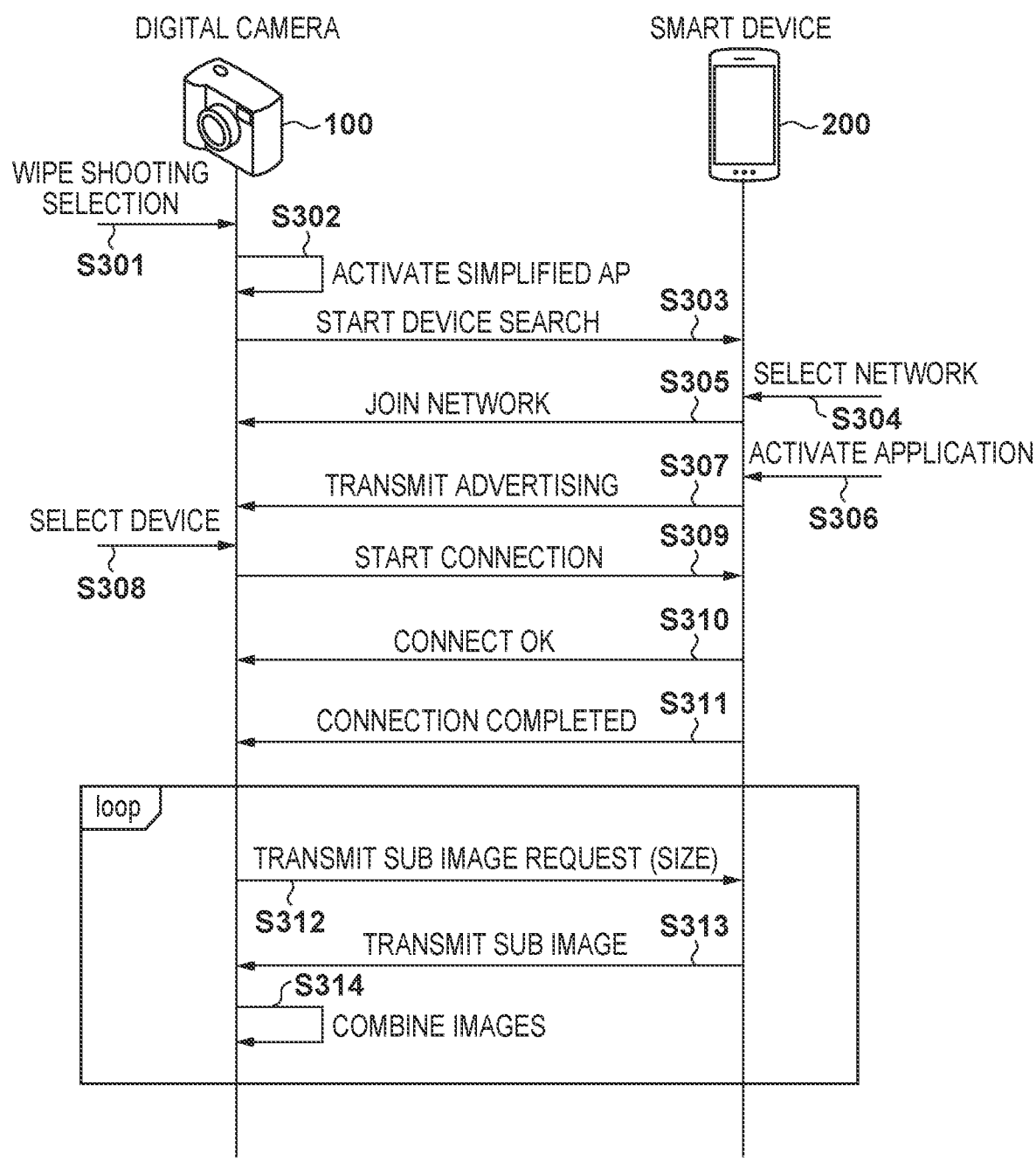
FIG. 3 is a sequence diagram showing wipe shooting processing by a digital camera and a smart device according to a first embodiment.

FIG. 3 shows a sequence of the wipe shooting processing in which the digital camera 100 according to the present embodiment performs wireless communication with the smart device 200, and combines image data received from the smart device 200 with image data output from the image capturing unit 102. FIGS. 4A to 4E exemplarily show UI screens that are displayed on the digital camera 100 at the time of wipe shooting according to the present embodiment.

In step S301, the control unit 101 of the digital camera 100 displays a menu list screen 401 of FIG. 4A on the display unit 106, and the user can select any item, including the wipe shooting processing according to the present embodiment, from the menu items of FIG. 4A via the operation unit 105. Upon the user's selection of a wipe shooting button 450 from the menu items, the control unit 101 of the digital camera 100 accepts an instruction to execute the wipe shooting processing.

Note that other menu items that can be selected on the menu list screen 401 of FIG. 4A include image transfer, remote operation, and live (real-time) delivery. In the image transfer, selecting an image transfer button enables the execution of the function of transferring an image to an external apparatus. In the remote operation, selecting a remote operation button enables the execution of the function of remotely operating the digital camera 100 from an external apparatus. In the live delivery, selecting a live delivery button enables the execution of the function of sequentially transferring images captured by the digital camera 100 to an external apparatus.

If the control unit 101 of the digital camera 100 determines that the wipe shooting button 450 has been selected from the menu list screen 401 of FIG. 4A, it starts the processing from step S302 for wireless LAN connection. Note that Wi-Fi®, for example, can be used as the wireless LAN standards.

In step S302, the control unit 101 of the digital camera 100 generates a wireless LAN network by activating a simplified AP, and displays a connection screen 402 of FIG. 4B on the display unit 106. Here, the control unit 101 displays at least an SSID (Service Set Identifier), which is a network identifier, on the display unit 106 so that the smart device 200 to be connected can join the wireless LAN network generated in step S302. Also, when the wireless LAN network generated in step S302 is secured using an encryption key, the encryption key may be displayed together on the display unit 106.

In step S303, the control unit 101 of the digital camera 100 starts searching for a device. Note that a discovery protocol is used in the device search; for example, an SSDP (Single Service Discovery Protocol), a Multicast DNS, or the like can be used.

In step S304, the control unit 201 of the smart device 200 displays a list of SSIDs on an application screen (not shown) displayed on the display unit 206, and accepts the user's selection operation for joining the simplified AP network generated by the digital camera 100. Note that the SSID list screen is displayed by selecting, from menus of the OS of the smart device 200, a menu that is intended for the user to input an instruction to start the wireless LAN settings. Also, the display unit 106 of the digital camera 100 displays a communication parameter of the network generated by the digital camera 100 as shown on the screen 402 of FIG. 4B. While looking at the SSID displayed on the screen 402 of the digital camera 100, the user can select the SSID of the network generated by the digital camera 100 from among the SSIDs displayed on the list of SSIDs.

Upon selection of the simplified AP network generated by the digital camera 100 in step S304, the control unit 201 of the smart device 200 joins the simplified AP network of the digital camera 100 in step S305. When the smart device 200 has joined the simplified AP network, the settings of an IP address and the like are performed, and the connection between the digital camera 100 and the smart device 200 is established on a network level.

Next, the control unit 201 of the smart device 200 establishes the connection on an application level.

In step S306, the control unit 201 of the smart device 200 accepts, via the operation unit 205, an operation to activate an application stored in the nonvolatile memory 203 of the smart device 200.

In step S307, in accordance with the control of the application activated in step S306, the control unit 201 of the smart device 200 broadcasts an advertising notification to the network it has joined, and notifies the digital camera 100 of its own existence. Note that a discovery protocol is used for the advertising notification; for example, an SSDP (Single Service Discovery Protocol) or a Multicast DNS can be used.

In step S308, upon receiving the advertising notification in step S307, the control unit 101 of the digital camera 100 displays a screen 403 of FIG. 4C, which includes a device name included in an advertising packet, on the display unit 106. The screen 403 of FIG. 4C displays a list of connectable devices. The user can select a device to be connected from the screen 403 of FIG. 4C via the operation unit 105.

In step S309, upon selection of the device to be connected from the screen 403 of FIG. 4C, the control unit 101 of the digital camera 100 starts processing for connecting to the selected device, and displays a screen 404 of FIG. 4D on the display unit 106. Here, it is assumed that the smart device 200 has been selected as the device to be connected.

In step S310, the control unit 201 of the smart device 200 gives notification of whether the connection is possible to the digital camera 100. The control unit 201 of the smart device 200 gives notification of connection OK if the connection is possible, and gives notification of connection impossible if the connection is not possible. Here, it is assumed that the notification of connection OK is given.

In step S311, in response to the notification of connection OK in step S310, the application-level connection between the digital camera 100 and the smart device 200 is completed.

In step S312, the control unit 101 of the digital camera 100 determines the size of sub image data in accordance with the size of main image data output from the image capturing unit 102, and transmits a sub image request including size information of the sub image data to the smart device 200. Here, the size of image data denotes, for example, the resolution (dpi) such as the total number of pixels in the image data and the number of pixels along the long side or the short side of the image data. Note that the specifics of processing for determining the size of the sub image data will be described later.

In step S313, the control unit 201 of the smart device 200 adjusts (resizes) the size of the sub image data based on the size information of the sub image data, which is included in the sub image request received in step S312, and transmits the sub image data to the digital camera 100.

In step S314, the control unit 101 of the digital camera 100 combines main image data output from the image capturing unit 102 and the sub image data received in step S313. Note that the display unit 106 of the digital camera 100 displays combined image data, in which a sub image 460 is superimposed on a main image, as shown on a screen 405 of FIG. 4E. Also note that, when the shooting instruction is issued (the second shutter switch signal SW2 is turned on) in a state where the screen 405 of FIG. 4E is displayed, the combined image data may be stored on the recording medium 110.

Thereafter, the control unit 101 of the digital camera 100 repeatedly performs processing of steps S312 to S314.

In the above-described manner, the wipe shooting processing is executed in which the digital camera 100 performs wireless communication with the smart device 200, and combines image data received from the smart device 200 with image data output from the image capturing unit 102.

<Operation of Digital Camera 100>

Next, control processing of the digital camera 100 for implementing the wipe shooting processing of FIG. 3 will be described with reference to FIGS. 5A and 5B.

Note that the processing of FIGS. 5A and 5B is implemented by the control unit 101 of the digital camera 100 loading programs that have been read out from the nonvolatile memory 103 to the work memory 104 and executing the programs. This also applies to FIG. 8 to be described later.

In step S501, the control unit 101 determines whether wipe shooting has been selected from the screen 401 of FIG. 4A; the processing proceeds to step S502 if it is determined that wipe shooting has been selected, and the processing returns to step S501 if it is determined that wipe shooting has not been selected. The processing of step S501 corresponds to step S301 of FIG. 3.

In step S502, the control unit 101 generates a wireless LAN network by activating a simplified AP. The processing of step S502 corresponds to step S302 of FIG. 3.

In step S503, the control unit 101 starts searching for a device. The processing of step S503 corresponds to step S303 of FIG. 3.

In step S504, the control unit 101 determines whether a device has been discovered; the processing proceeds to step S505 if it is determined that a device has been discovered, and the processing ends if it is determined that a device has not been discovered. The processing of step S504, which corresponds to step S307 of FIG. 3, determines that a device has been discovered if an advertising notification has been received, and determines that a device has not been discovered if the advertising notification has not been received. Note that, in this determination, it may be determined that a device has not been discovered if the advertising notification has not been received for a predetermined period.

In step S505, the control unit 101 selects a device to be connected. In the selection of a device to be connected, the selection may be made by a user operation via the operation unit 105, or a device that satisfies a predetermined condition may be selected; for example, a device that was discovered first may be selected. The processing of step S505 corresponds to step S308 of FIG. 3.

In step S506, the control unit 101 performs processing for connecting to the device. Note that the processing of step S506 corresponds to steps S309 to S311 of FIG. 3.

In step S507, the control unit 101 performs size determination processing for sub image data. FIG. 5B shows the specifics of the size determination processing for the sub image data. Note that, below, it is assumed that the size of image data denotes the resolution. This also applies to FIGS. 8, 9A and 9B to be described later.

In step S551, the control unit 101 determines whether image data output from the image capturing unit 102 and combined image data generated by the image combining unit 112 are being recorded on the recording medium 110. If the control unit 101 determines that they are being recorded, the processing proceeds to step S552, and if the control unit 101 determines that they are not being recorded, the processing proceeds to step S555.

In step S552, the control unit 101 obtains the resolution of main image data output from the image capturing unit 102. Note that the resolution of main image data denotes the resolution of image data output from the image capturing unit 102, and can be changed by the settings of the digital camera 100.

In step S553, the control unit 101 compares the resolution of the main image data obtained in step S552 with a threshold to determine whether the resolution is higher than or equal to the threshold. If the control unit 101 determines that the resolution is higher than or equal to the threshold, the processing proceeds to step S554, and if the control unit 101 determines that the resolution is lower than the threshold, the processing proceeds to step S555. Here, for example, it is determined whether the total number of pixels in the main image data is equal to or larger than 930,000 pixels, whether the resolution along the long side of the main image data is higher than or equal to 2,000 pixels, or the like.

In step S554, the control unit 101 determines the resolution of the sub image data to be "high" and ends the size determination processing for the sub image data, and the processing proceeds to step S508. The "high" resolution of the sub image data means that it is higher than the "low" resolution of the sub image data, which will be described in step S555, and it is assumed that the "high" resolution is, for example, 1,280 pixels in width×720 pixels in height.

In step S555, the control unit 101 determines the resolution of the sub image data to be "low" and ends the size determination processing for the sub image data, and the processing proceeds to step S508. The "low" resolution of the sub image data is, for example, 640 pixels in width×360 pixels in height, and means that it is lower than the "high" resolution of the sub image data described in step S554. Note that the reason why the resolution of the sub image data is determined to be "low" when the image data output from the image capturing unit 102 and the combined image data generated by the image combining unit 112 are not being recorded on the recording medium 110 in step S551 is because, when they are not being recorded, merely displaying the sub image on the display unit 106 enables the user to sufficiently recognize the sub image, even with the "low" resolution of the sub image.

Note that when the processing has returned from step S511 (to be described later) to step S507, the previous resolution may be determined as the resolution if the recording state and the resolution of the main image data have not been changed after the size determination processing for the sub image data was previously performed.

In step S508, the control unit 101 transmits a sub image request including size information of the sub image data, which was determined in step S507, to the smart device 200, which is a communication partner. Note that the processing of step S508 corresponds to step S312 of FIG. 3.

In step S509, the control unit 101 receives the sub image data from the smart device 200, which is the communication partner, as a response to the sub image request transmitted in step S508. Note that the resolution of the sub image data received here is the resolution of the sub image data determined in step S507. Also note that the processing of step S509 corresponds to step S313 of FIG. 3.

In step S510, the control unit 101 combines the main image data output from the image capturing unit 102 and the sub image data received in step S509. Note that the processing of step S510 corresponds to step S314 of FIG. 3.

In step S511, the control unit 101 determines whether to end the processing; if it is determined that the processing is not to be ended, the processing returns to step S507, and if it is determined that the processing is to be ended, the processing is ended. It is determined that the processing is to be ended when a function other than wipe shooting has been selected on the screen 401 of FIG. 4A, or when the digital camera 100 is shut down by turning off its power.

According to the present embodiment, when combining the main image data output from the image capturing unit 102 and the sub image data received from the smart device 200, the digital camera 100 receives the sub image data of a resolution appropriate for the main image data from the smart device 200. The digital camera 100 determines the resolution of the sub image data based on the resolution of the main image data. Then, the smart device 200, which is the communication partner, is notified of the determined resolution of the sub image data, the sub image data of the determined resolution is received from the smart device 200, and a combined image is generated. By thus determining the resolution of the sub image data based on the resolution of the main image data, a combined image with an excellent appearance can be generated.

Second Embodiment

Next, a second embodiment will be described.

The second embodiment describes wipe shooting processing in which the digital camera 100 performs wireless communication with a plurality of smart devices 200A, 200B, and combines a plurality of pieces of sub image data received from the respective smart devices 200A, 200B and image data output from the image capturing unit 102.

Note that the configuration of the digital camera 100 and the configuration of the smart device 200A and the smart device 200B are similar to that of the smart device 200 according to the first embodiment. Also note that communication processing between the digital camera 100 and each of the smart devices 200A, 200B is similar to that according to the first embodiment.

<Wipe Shooting Processing>

Next, wipe shooting processing by the digital camera 100 and the smart devices 200A, 200B according to the present embodiment will be described with reference to FIGS. 6 and 7A to 7G.

Figure 6:
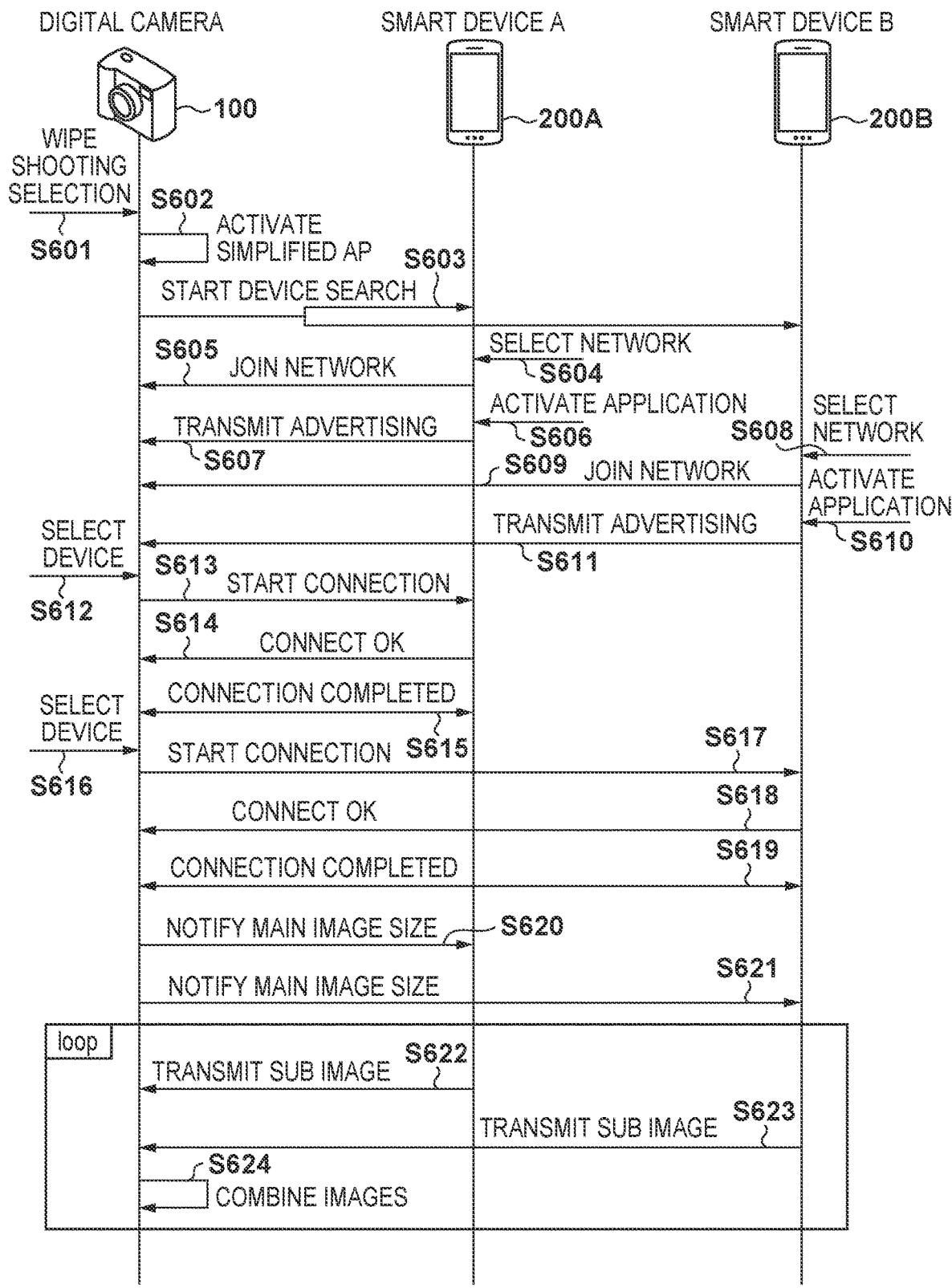
FIG. 6 is a sequence diagram showing wipe shooting processing by a digital camera and smart devices according to a second embodiment.

FIG. 6 shows a sequence of the wipe shooting processing in which the digital camera 100 according to the present embodiment performs wireless communication with the smart devices 200A, 200B, and combines image data received from the smart devices 200A, 200B with image data output from the image capturing unit 102. FIGS. 7A to 7G exemplarily show UI screens that are displayed on the digital camera 100 at the time of wipe shooting according to the present embodiment.

Figure 7A:
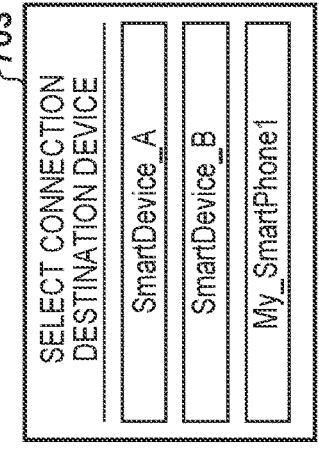
FIGS. 7A to 7G are diagrams exemplarily showing the screens that are displayed on the digital camera at the time of wipe shooting according to the second embodiment.
Figure 7B:
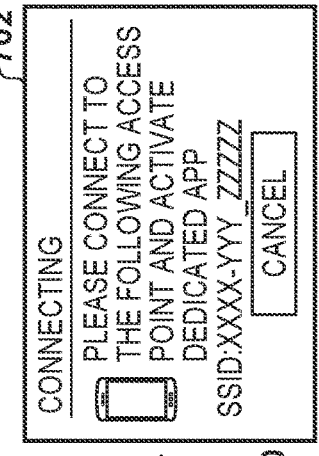
Figure 7C:
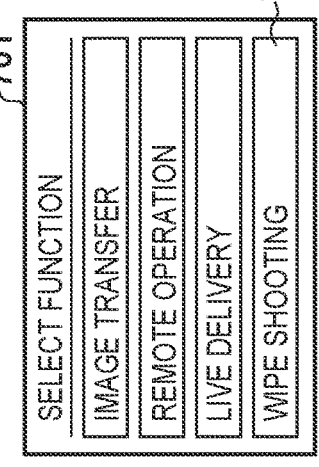
Figure 7D:
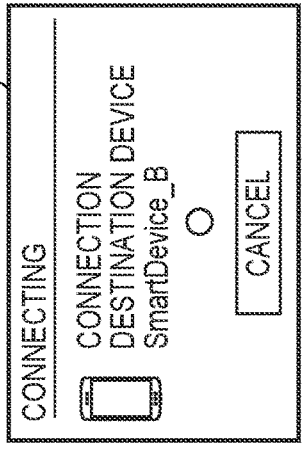
Figure 7E:
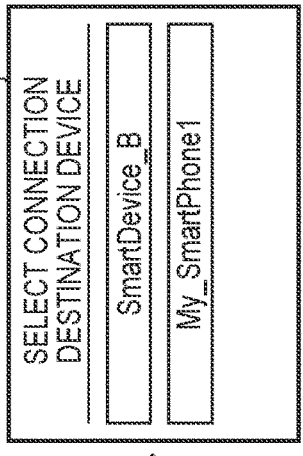

In step S601, the control unit 101 of the digital camera 100 displays a menu list screen 701 of FIG. 7A on the display unit 106, similarly to step S301 of FIG. 3. Then, upon the user's selection of a wipe shooting button 750 from the menu items, the control unit 101 of the digital camera 100 accepts an instruction to execute the wipe shooting processing. If the control unit 101 of the digital camera 100 determines that the wipe shooting button 750 has been selected from the menu list screen 701 of FIG. 7A, it starts the processing from step S602 for wireless LAN connection.

Figure 7F:
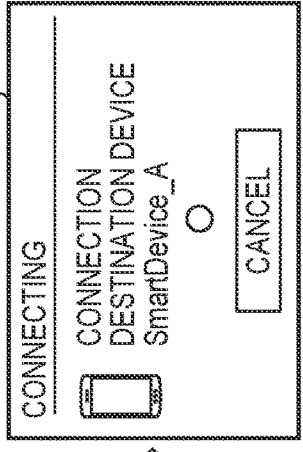

From step S602 to step S619, connection processing that is similar to steps S302 to S311 of FIG. 3 is executed between the digital camera 100 and the smart devices 200A, 200B. A screen 702 of FIG. 7B to a screen 706 of FIG. 7F show a screen transition until the digital camera 100 connects to the smart devices 200A, 200B, similarly to the screen 402 of FIG. 4B to the screen 404 of FIG. 4D.

In step S620, the control unit 101 of the digital camera 100 notifies the smart device 200A of the size of main image data.

In step S621, the control unit 101 of the digital camera 100 notifies the smart device 200B of the size of the main image data.

In step S622, the control unit 201 of the smart device 200A resizes the size of sub image data based on size information of the main image data received in step S620, and transmits the sub image data to the digital camera 100.

In step S623, the control unit 201 of the smart device 200B resizes the size of sub image data based on size information of the main image data received in step S621, and transmits the sub image data to the digital camera 100.

Figure 7G:
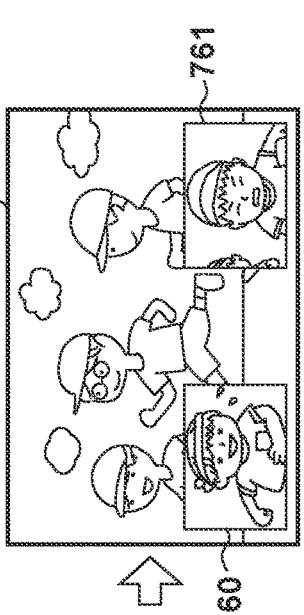

In step S624, the control unit 101 of the digital camera 100 combines the main image data output from the image capturing unit 102, the sub image data received in step S622, and the sub image data received in step S623, similarly to step S314 of FIG. 3. Note that the display unit 106 of the digital camera 100 displays combined image data, in which a sub image 760 received from the smart device 200A and a sub image 761 received from the smart device 200B are superimposed on a main image, as shown on a screen 707 of FIG. 7G. Also note that, when the shooting instruction is issued (the second shutter switch signal SW2 is turned on) in a state where the screen 707 of FIG. 7G is displayed, the combined image data may be stored on the recording medium 110.

Thereafter, the control unit 101 of the digital camera 100 repeatedly performs processing of steps S622 to S624.

In the above-described manner, the wipe shooting processing is executed in which the digital camera 100 performs wireless communication with the smart devices 200A, 200B, and combines image data received from the smart devices 200A, 200B with image data output from the image capturing unit 102.

<Operation of Digital Camera 100>

Figure 8:
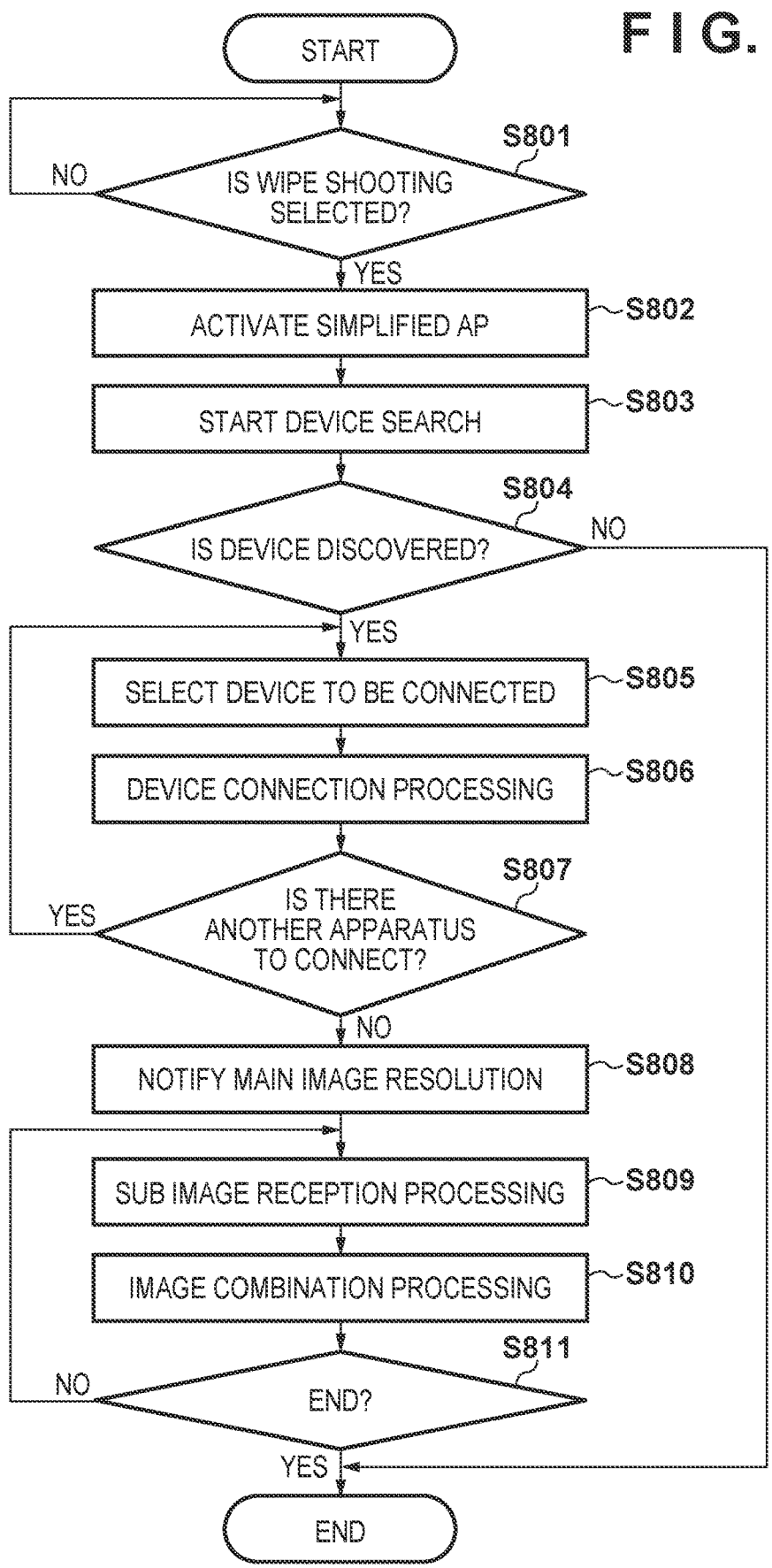
FIG. 8 is a flowchart showing processing of the digital camera at the time of wipe shooting according to the second embodiment.

Next, control processing of the digital camera 100 for implementing the wipe shooting processing of FIG. 6 will be described with reference to FIG. 8.

From step S801 to step S806, the control unit 101 executes processing that is similar to steps S501 to S506 of FIG. 5A with the smart device 200A.

In step S807, the control unit 101 determines whether to further connect to another device; if it is determined that connection to another device is to be made, the processing returns to step S805, and if it is determined that connection to another device is not to be made, the processing proceeds to step S808. In the present embodiment, it is assumed that connection to the smart device 200B, as another device, is made after connecting to the smart device 200A. Note that whether to connect to another device may be selected by a user operation via the operation unit 105, or the number of devices to connect to may be determined in advance, for example.

In steps S805 and S806, the control unit 101 executes processing that is similar to steps S505 and S506 of FIG. 5A with the smart device 200B.

In step S808, the control unit 101 transmits the resolution of main image data output from the image capturing unit 102 to the communication partner(s), that is, the smart device 200A and/or the smart device 200B.

In steps S809 and S810, the control unit 101 executes processing that is similar to steps S508 to S511 of FIG. 5A with the communication partner(s), that is, the smart device 200A and/or the smart device 200B.

<Operation of Smart Devices 200A, 200B>

Next, control processing of the smart devices 200A, 200B for implementing the wipe shooting processing of FIG. 6 will be described with reference to FIGS. 9A and 9B.

Figure 9B:
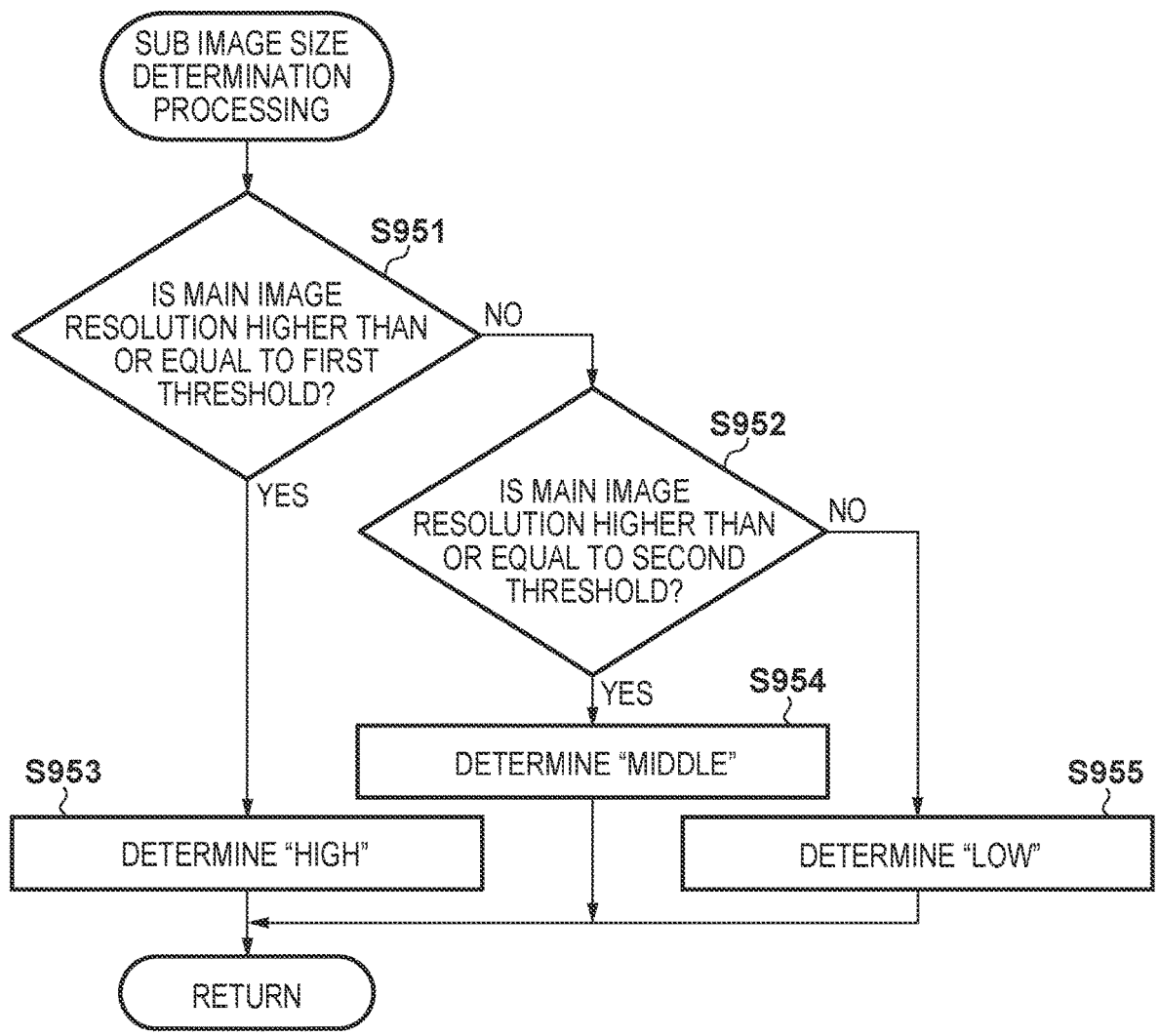

Note that the processing of FIGS. 9A and 9B is implemented by the control unit 201 of the smart devices 200A, 200B loading programs that have been read out from the nonvolatile memory 203 to the work memory 204 and executing the programs.

In step S901, the control unit 201 determines whether the user has selected a network. If the control unit 201 determines that a network has been selected, the processing proceeds to step S902, and if the control unit 201 determines that a network has not been selected, the processing returns to step S901. The processing of step S901 corresponds to steps S604 and S608 of FIG. 6.

In step S902, the control unit 201 joins the wireless LAN network selected in step S901. The processing of step S902 corresponds to steps S605 and S609 of FIG. 6.

In step S903, the control unit 201 determines whether the user has activated an application, and if it is determined that an application has been activated, the processing proceeds to step S904. The processing of step S903 corresponds to steps S606 and S610 of FIG. 6.

In step S904, in accordance with the control of the application activated in step S903, the control unit 201 broadcasts an advertising notification to the network it has joined, and notifies the digital camera 100 of its own existence. The processing of step S904 corresponds to steps S607 and S611 of FIG. 6.

In step S905, the control unit 201 performs processing for connecting to a device. The processing of step S905 corresponds to steps S613 to S615 and steps S617 to S619 of FIG. 6.

In step S906, the control unit 201 receives the resolution of main image data. The processing of step S906 corresponds to steps S620 and S621 of FIG. 6.

In step S907, the control unit 201 performs size determination processing for sub image data. FIG. 9B shows the specifics of size determination processing for a sub image.

In step S951, the control unit 201 determines whether the resolution of the main image data received in step S906 is higher than or equal to a first threshold; if it is determined that the resolution is higher than or equal to the first threshold, the processing proceeds to step S953, and if it is determined that the resolution is lower than the first threshold, the processing proceeds to step S952.

In step S952, the control unit 201 determines whether the resolution of the main image data received in step S906 is higher than or equal to a second threshold, which is lower than the first threshold. If the control unit 201 determines that the resolution is higher than or equal to the second threshold, the processing proceeds to step S954, and if the control unit 201 determines that the resolution is lower than the second threshold, the processing proceeds to step S955.

In step S953, the control unit 201 determines the resolution of the sub image data to be "high" and ends the resolution determination processing for the sub image data, and the processing proceeds to step S908. The "high" resolution of the sub image data means that it is higher than the "middle" and "low" resolutions of the sub image data, which will be described in steps S954 and S955.

In step S954, the control unit 201 determines the resolution of the sub image data to be "middle" and ends the resolution determination processing for the sub image data, and the processing proceeds to step S908. The "middle" resolution of the sub image data means that it is lower than the "high" resolution of the sub image data, which was described in step S953, and higher than the "low" resolution of the sub image, which will be described in step S955.

In step S955, the control unit 201 determines the resolution of the sub image to be "low" and ends the resolution determination processing for the sub image data, and the processing proceeds to step S908. The "low" resolution of the sub image data means that it is lower than the "high" and "middle" resolutions of the sub image, which were described in steps S953 and S954.

In step S908, the control unit 201 transmits the sub image data that has been resized to the resolution determined in step S907 to the digital camera 100. Note that the resolution of the sub image data transmitted here is the resolution of the sub image data determined in step S907; in this regard, the resolution of the image data output from the image capturing unit 202 may be conformed to the determined resolution of the sub image data. Alternatively, the image data output from the image capturing unit 202 may be resized so that its resolution conforms to the determined resolution of the sub image data.

In step S909, the control unit 201 determines whether to end the processing; if it is determined that the processing is not to be ended, the processing returns to step S908, and if it is determined that the processing is to be ended, the processing is ended. It is determined that the processing is to be ended when an application screen is ended, or when another application screen is activated.

According to the present embodiment, when combining the image data of the main image output from the image capturing unit 102 and the image data of the sub images received from the smart devices 200A, 200B, the digital camera 100 receives the sub image data of a resolution appropriate for the main image data from the smart devices 200A, 200B. The smart devices 200A, 200B determine the resolution of the sub image data based on the resolution of the main image data, and transmit the sub image data of the determined resolution to the digital camera 100. By thus determining the resolution of the sub image data based on the resolution of the main image data, a combined image with an excellent appearance can be generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-085719, filed Apr. 26, 2018, which is hereby incorporated by reference herein in its entirety.

What is claimed is:

1. A communication apparatus, comprising:
   a wireless communication unit;
   an image capturing unit; and
   a control unit,
   wherein the control unit controls the image capturing unit to sequentially generate images by capturing images of an object,
   wherein the control unit determines whether a resolution of an image generated by the image capturing unit is equal to or higher than a predetermined resolution,
   wherein when the control unit determines that the resolution of the image generated by the image capturing unit is higher than or equal to the predetermined resolution, the control unit transmits, to an external apparatus via the wireless communication unit, a first request that requests the external apparatus for an image of a resolution corresponding to a resolution higher than or equal to the predetermined resolution, and when the control unit determines that the resolution of the image generated by the image capturing unit is not higher than or equal to the predetermined resolution, the control unit transmits, to the external apparatus via the wireless communication unit, a second request that requests the external apparatus for an image of a resolution corresponding to a resolution lower than the predetermined resolution, wherein the control unit performs control to sequentially receive, from the external apparatus via the wireless communication unit, images that are sequentially captured by the external apparatus that has received the first request or the second request, wherein the control unit performs control to combine the images that are captured by the external apparatus and sequentially received from the external apparatus with the images that are sequentially generated by the image capturing unit, and sequentially display the combined images, wherein the control unit determines whether or not combined images are being recorded on a recording medium, the combined images being obtained by combining the images that are captured by the external apparatus and sequentially received from the external apparatus with the images that are sequentially generated by the image capturing unit, wherein, when the combined images are being recorded on the recording medium, the control unit controls whether to transmit the first request or the second request depending on the determined resolution of the image generated by the image capturing unit, and when the combined images are not being recorded on the recording medium, the control unit does not transmit the first request but transmits the second request regardless of the resolution of the image generated by the image capturing unit.

2. The apparatus according to claim 1, further comprising an operation unit, wherein the control unit controls the image capturing unit to generate images with a resolution based on an instruction that has been accepted from a user via the operation unit.

3. The apparatus according to claim 1, wherein the communication apparatus has a plurality of shooting modes including a wipe shooting mode, and the control unit controls the image capturing unit to perform shooting in a mode corresponding to an instruction from a user.

4. The apparatus according to claim 3, wherein
the control unit transmits the first request or the second request to the external apparatus upon a start of the wipe shooting mode.

5. The apparatus according to claim 3, wherein
the control unit transmits the first request or the second request to the external apparatus upon accepting a recording instruction from the user in the wipe shooting mode.

6. The apparatus according to claim 1, wherein
the control unit performs control to communicate with a plurality of external apparatuses via the wireless communication unit, and the control unit performs control to display combined images obtained by combining a plurality of images that are sequentially received from the plurality of external apparatuses with the images that are sequentially generated by the image capturing unit.

7. The apparatus according to claim 1, wherein
the control unit controls the wireless communication unit to generate a Wi-Fi network by operating as an access point.

8. The apparatus according to claim 1, wherein
the control unit performs control to sequentially display the combined images while recording images of the object.

9. A method of controlling a communication apparatus including a wireless communication unit, and an image capturing unit, the method comprising:

controlling the image capturing unit to sequentially generate images by capturing images of an object, determining whether a resolution of an image generated by the image capturing unit is equal to or higher than a predetermined resolution, when it is determined that the resolution of the image generated by the image capturing unit is higher than or equal to the predetermined resolution, transmitting, to an external apparatus via the wireless communication unit, a first request that requests the external apparatus for an image of a resolution corresponding to a resolution higher than or equal to the predetermined resolution, and when it is determined that the resolution of the image generated by the image capturing unit is not higher than or equal to the predetermined resolution, transmitting, to the external apparatus via the wireless communication unit, a second request that requests the external apparatus for an image of a resolution corresponding to a resolution lower than the predetermined resolution, performing control to sequentially receive, from the external apparatus via the wireless communication unit, images that are sequentially captured by the external apparatus that has received the first request or the second request, and performing control to combine the images that are captured by the external apparatus and sequentially received from the external apparatus with the images that are sequentially generated by the image capturing unit, and sequentially display the combined images, determining whether or not combined images are being recorded on a recording medium, the combined images being obtained by combining the images that are captured by the external apparatus and sequentially received from the external apparatus with the images that are sequentially generated by the image capturing unit, and when the combined images are being recorded on the recording medium, controlling whether to transmit the first request or the second request depending on the determined resolution of the image generated by the image capturing unit, and when the combined images are not being recorded on the recording medium, not transmitting the first request but transmitting the second request regardless of the resolution of the image generated by the image capturing unit.

10. A non-transitory computer-readable storage medium storing a program for causing a computer to function as a communication apparatus including a wireless communication unit and an image capturing unit, to execute a method, the method comprising:

controlling the image capturing unit to sequentially generate images by capturing images of an object, determining whether a resolution of an image generated by the image capturing unit is equal to or higher than a predetermined resolution, when it is determined that the resolution of the image generated by the image capturing unit is higher than or equal to the predetermined resolution, transmitting, to an external apparatus via the wireless communication unit, a first request that requests the external apparatus for an image of a resolution corresponding to a resolution higher than or equal to the predetermined resolution, and when the it is determined that the resolution of the image generated by the image capturing unit is not higher than or equal to the predetermined resolution, transmitting, to the external apparatus via the wireless communication unit, a second request that requests the external apparatus for an image of a resolution corresponding to a resolution lower than the predetermined resolution, performing control to sequentially receive, from the external apparatus via the wireless communication unit, images that are sequentially captured by the external apparatus that has received the first request or the second request, and performing control to combine the images that are captured by the external apparatus and sequentially received from the external apparatus with the images that are sequentially generated by the image capturing unit, and sequentially display the combined images, determining whether or not combined images are being recorded on a recording medium, the combined images being obtained by combining the images that are captured by the external apparatus and sequentially received from the external apparatus with the images that are sequentially generated by the image capturing unit, and when the combined images are being recorded on the recording medium, controlling whether to transmit the first request or the second request depending on the determined resolution of the image generated by the image capturing unit, and when the combined images are not being recorded on the recording medium, not transmitting the first request but transmitting the second request regardless of the resolution of the image generated by the image capturing unit.

* * * * *